United States Patent [19]

Horisawa

[11] Patent Number: 5,244,573
[45] Date of Patent: Sep. 14, 1993

[54] PAINT SLUDGE SEPARATOR TANK

[75] Inventor: Satoshi Horisawa, Hirakata, Japan

[73] Assignee: Taikisha Ltd., Tokyo, Japan

[21] Appl. No.: 856,082

[22] Filed: Mar. 19, 1992

[30] Foreign Application Priority Data

Mar. 20, 1991 [JP] Japan .................................. 3-55371

[51] Int. Cl.⁵ .............................................. B01D 21/24
[52] U.S. Cl. ...................................... 210/519; 210/540; 210/527; 210/535
[58] Field of Search ..................... 210/519, 532.1, 538, 210/540, 534, 535, 525, 527

[56] References Cited

U.S. PATENT DOCUMENTS

| | | | |
|---|---|---|---|
| 2,098,467 | 11/1937 | Sayers et al. | 210/519 |
| 3,419,145 | 12/1968 | Celis | 210/519 |
| 3,529,728 | 9/1970 | Middelbeek et al. | 210/540 |
| 4,271,017 | 6/1981 | Milgram | 210/519 |
| 4,619,771 | 10/1986 | Stall et al. | 210/519 |
| 4,722,791 | 2/1988 | Turnquist | 210/320 |
| 5,120,436 | 6/1992 | Reichner | 210/519 |

FOREIGN PATENT DOCUMENTS 476506  9/1969  Switzerland.

Primary Examiner—Christopher Upton
Attorney, Agent, or Firm—Webb, Burden, Ziesenheim & Webb

[57] ABSTRACT

A paint sludge separator tank includes a sludge drain formed on an upper end of a reservoir region for discharging paint sludge floating on a surface of stored liquid, and a liquid feeder for feeding paint-containing liquid to an upper position of the reservoir region horizontally spaced from the sludge drain. The liquid feeder includes a feed hopper defining a sectional passage area progressively enlarging toward an upper delivery opening thereof communicating with the upper position of the reservoir region. The feed hopper has a liquid supply passage connected to a lower position thereof.

8 Claims, 5 Drawing Sheets

PAINT SLUDGE SEPARATOR TANK

BACKGROUND OF THE INVENTION

1. Field of the Invention

The present invention relates to a paint sludge separating tank, and more particularly to a paint sludge separating tank for separating and removing paint components from a liquid used for cleaning and removing spray mist from exhaust air from spraying equipment, the tank comprising a sludge drain formed on an upper end of a reservoir region for discharging paint sludge floating on a surface of stored liquid, and a liquid feeder for feeding paint-containing liquid to an upper position of the reservoir region horizontally spaced from the sludge drain.

2. Description of the Related Art

FIG. 6 shows a paint sludge separator tank of the type noted above. Waste liquid W under treatment is supplied to upper positions of a reservoir region horizontally remote from a floating sludge drain 12, whereby horizontal flows V are formed on the upper part of stored liquid W, flowing from the liquid supply positions toward the floating sludge drain 12. Paint sludge S including paint components of the liquid under treatment and floating on the liquid is collected toward the sludge drain 12 by the upper horizontal flows V. The tank includes a skimmer 13 or the like for smoothly and efficiently separating the floating paint sludge S and discharging the sludge S along the upper flowing direction to the sludge drain 12.

Conventionally, the liquid W to be treated is supplied to the tank through a feed pipe 8a extending to the upper positions of the reservoir region horizontally remote from the floating sludge drain 12. The feed pipe 8a has opening ends disposed in the stored liquid. See U.S. Pat. No. 4,722,791, for example.

According to the above liquid feeding construction, however, the upper part of the stored liquid is disturbed and ascent of the paint sludge S to the liquid surface hampered under the influence of the dynamic pressure of the liquid delivered for treatment. In addition, the liquid being delivered is obstructive to floating stability and collection of the floating sludge S by the horizontal flows V of the upper part of the liquid. This results in a reduced efficiency of separating the paint sludge.

SUMMARY OF THE INVENTION

The object of the present invention is to provide a paint sludge separator tank having an improved liquid supply construction to overcome the disadvantage of the prior art.

The above object is fulfilled, according to the present invention, by a paint sludge separator tank comprising a sludge drain formed on an upper end of a reservoir region for discharging paint sludge floating on a surface of stored liquid, and a liquid feeder for feeding paint-containing liquid to an upper position of the reservoir region horizontally spaced from the sludge drain, wherein the liquid feeder includes a feed hopper defining a sectional passage area progressively enlarging toward an upper delivery opening thereof communicating with the upper position of the reservoir region, the feed hopper having a liquid supply passage connected to a lower position thereof.

With the above construction, the liquid supplied through the liquid supply passage to the lower position of the feed hopper is decelerated in its ascent toward the upper delivery opening owing to the increasing sectional area of the passage through the feed hopper, and then delivered from the upper delivery opening to upper positions in the reservoir region.

Compared with the conventional construction, the influence of the dynamic pressure under which the liquid is delivered to the upper positions in the reservoir region is reduced. Thus, the construction according to the present invention effectively checks disturbance of the upper part of the stored liquid due to the dynamic delivery pressure.

In addition, growth and rise of floatable paint sludge are promoted in the course of decelerated upward flow of the liquid through the feed hopper since the liquid under treatment is allowed to flow upward through the feed hopper toward the upper delivery opening.

Consequently, according to the present invention, floating paint sludge is effectively collected toward the sludge drain by upper horizontal flows while paint sludge is allowed to rise in the reservoir region and float on the liquid surface in a stable condition by checking disturbance of the upper part of stored liquid. Moreover, since growth and rise of the paint sludge are promoted in the course of upward flow of the liquid through the feed hopper, this construction has a greatly improved paint sludge separating efficiency over the conventional construction.

The paint sludge separator tank according to the present invention may further comprise an impingement surface forming member with which the liquid delivered upward from the upper delivery opening for treatment collides in the stored liquid.

In this construction, the liquid delivered upward from the upper delivery opening of the feed hopper collides with the impingement surface forming member in the stored liquid. This produces the effect of preventing the upwardly delivered liquid from causing upheaval of the liquid surface in the reservoir region. Further, the liquid delivered for treatment is damped through this collision and smoothly forwarded to horizontal flow regions on the upper part of the stored liquid. Thus, the upper part of the liquid in the reservoir region is further stabilized, to promote the effect of collecting the floating paint sludge based on the upper horizontal flows.

In the paint sludge separator tank according to the present invention, the feed hopper may have a width perpendicular to a direction pointing to the sludge drain which increases progressively toward the upper delivery opening, the feed hopper including a constriction formed between the lower position thereof to which the liquid supply passage is connected and the upper delivery opening for narrowing an inner passage thereof in the direction pointing to the sludge drain.

The above construction, in which the feed hopper has a width perpendicular to the direction pointing to the sludge drain which increases progressively toward the upper delivery opening, secures a large width for the upper horizontal flows from the upper delivery opening of the feed hopper toward the floating sludge drain.

As noted above, the feed hopper, while having a width perpendicular to the direction pointing to the sludge drain which increases progressively toward the upper delivery opening, may also include a constriction formed between the lower position thereof to which the liquid supply passage is connected and the upper delivery opening for narrowing an inner passage thereof in the direction pointing to the sludge drain. The inner passage narrowed in the direction pointing to the sludge drain produces the effect of uniforming, in the direction perpendicular to the direction pointing to the sludge drain (i.e. transversely of the upper horizontal flows), the rising speed of the liquid through the constriction. The upper horizontal flows are formed with enhanced stability by the speed of the liquid emerging from the upper delivery opening which is uniformed transversely of the upper horizontal flows.

The upper horizontal flows are stabilized by the large width secured therefor and by the delivery speed of the liquid uniformed transversely of the upper horizontal flows. The stability of the upper horizontal flows contributes to stable collection of floating paint sludge on the upper part of the reservoir region, and guides the floating paint sludge toward the sludge drain.

Other features and advantages of the present invention will be apparent from the following description.

DETAILED DESCRIPTION OF THE PREFERRED EMBODIMENTS

A paint sludge separating tank according to the present invention will be described in detail with reference to the drawings.

Figure 1:
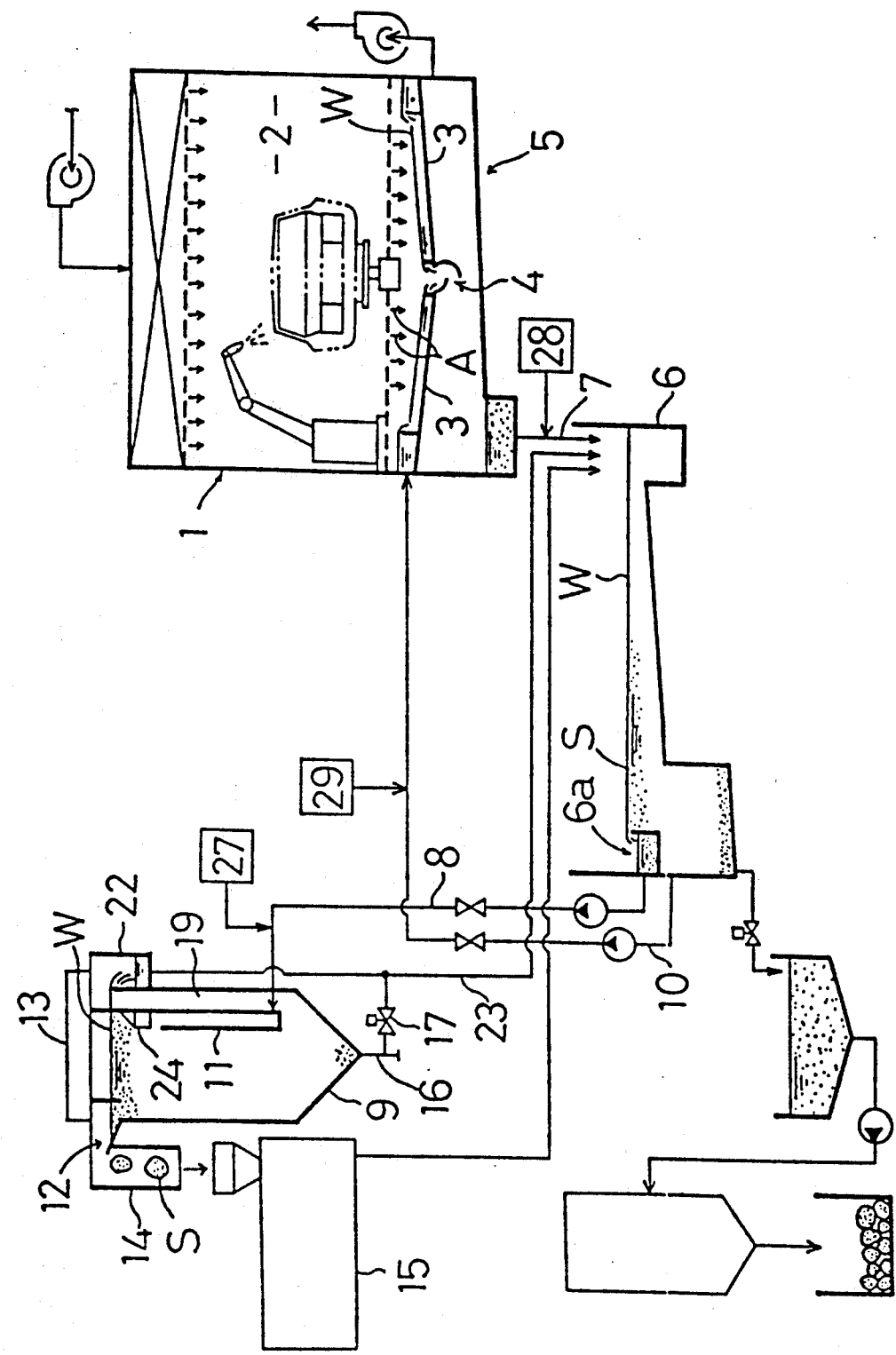
FIG. 1 is a system diagram of painting equipment.

FIG. 1 shows painting equipment including a spraying booth 1. The spraying booth 1 has a spraying chamber 2, and a paint mist removing apparatus 5 disposed below the spraying chamber 2. Water W flowing down a downflow pan 3 and exhaust air A from the spraying chamber 2 are passed confluently and at high speed through a constricted passage 4. As a result, paint mist in the exhaust air A is captured by the water W, thereby cleaning the exhaust air A.

Numeral 6 denotes a first separator tank for storing the water containing the paint mist and flowing through a passage 7. Upper part of water W containing paint mist and stored in the first separator tank 6 is allowed to overflow to a sludge pit 6a, along with paint sludge S having grown and risen to the surface during storage in the first separator tank 6. Subsequently, the water W is supplied through a passage 8 to a second separator tank 9.

Middle and lower part of the water W in the first separator tank 6 is returned to the downflow pan 3 in the spraying booth 1 for repeated use in capturing paint mist.

Figure 2:
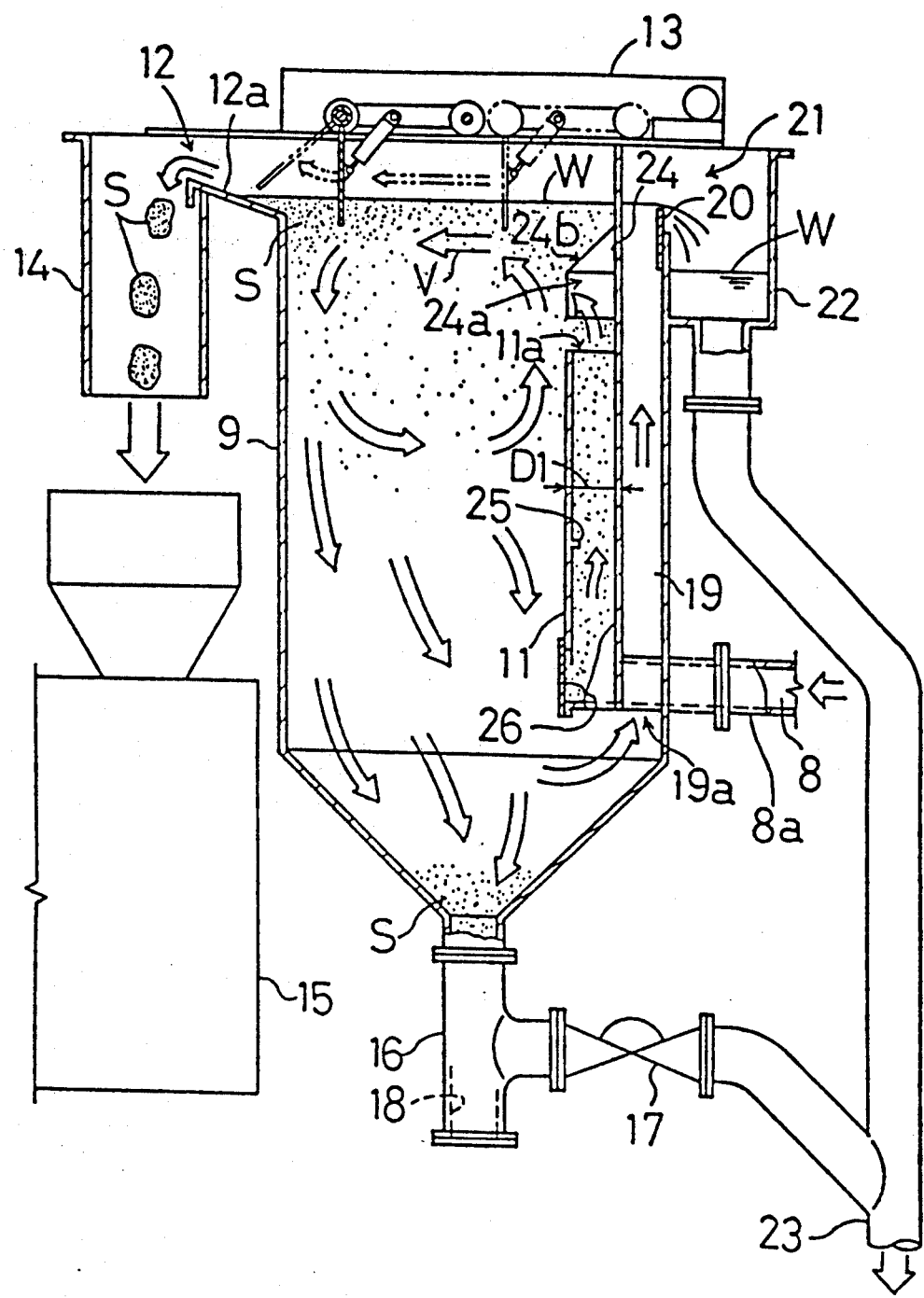
FIG. 2 is a sectional front view of a separator tank.
Figure 3:
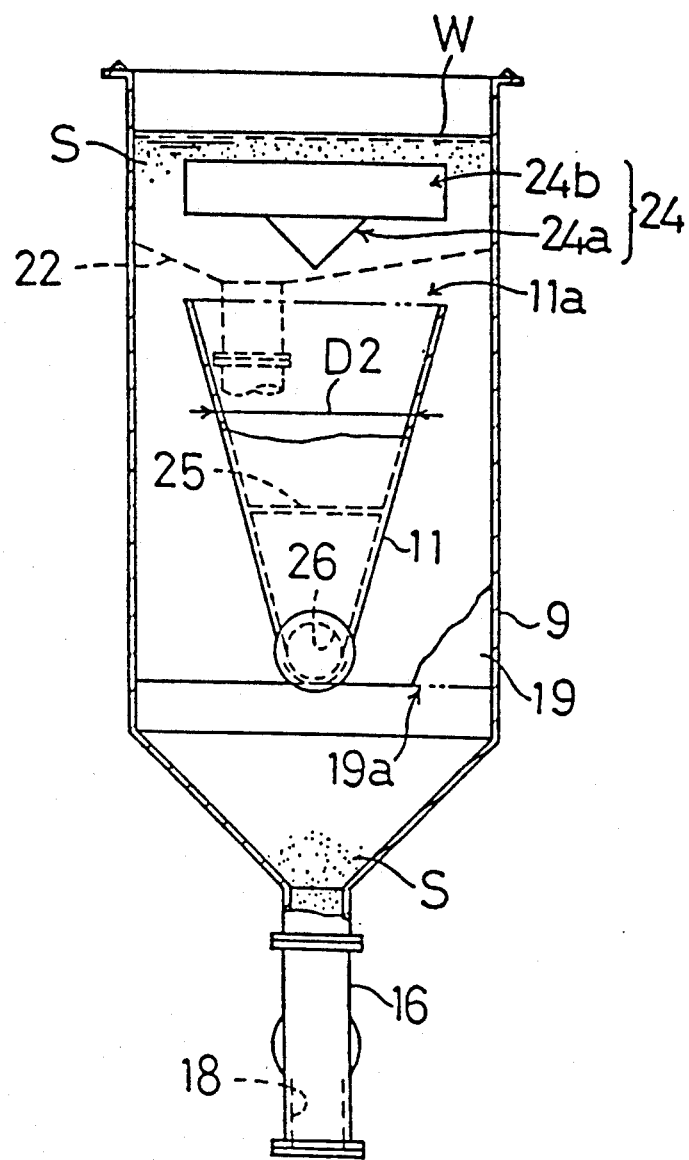
FIG. 3 is a sectional side view of the separator tank.
Figure 4:
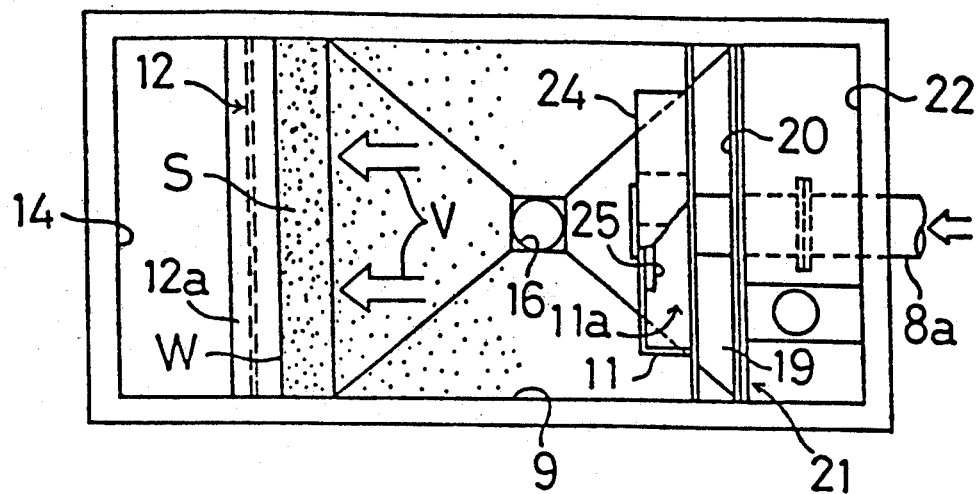
FIG. 4 is a plan view of the separator tank.

As shown in FIGS. 2 through 4, the second separator tank 9 is shaped square in plan view, with a hopper-like structure in a bottom thereof. The tank 9 includes a feed hopper 11 formed on one side wall thereof for feeding, to an upper position in a reservoir region, the paint-containing water W received from the sludge pit 6a of the first separator tank 6. The second separator tank 9 further includes a floating sludge drain 12 having a sludge barrier 12a defining an inclined floor surface on an upper end of the other side wall and reservoir region.

Thus, the paint-containing water W is fed to the upper position in the reservoir region adjacent the side wall opposite the floating sludge drain 12. As a result, lower part of the water is stored in the reservoir region with maximum stability. This promotes growth and ascent of floatable paint sludge, and growth and sedimentation of sedimentable paint sludge, which are formed of the paint contained in the water W under treatment. At the same time, laminar horizontal flows V are formed on and adjacent the surface of the stored water W, flowing from the one side wall toward the floating sludge drain 12 on the other side wall. Paint sludge S stably floating on the stored water W is collected by the upper horizontal flows V toward the sludge drain 12.

Numeral 13 denotes a skimmer for skimming the floating paint sludge S along the direction of upper horizontal flows V to separate the sludge S and discharge it to the sludge drain 12. The paint sludge S is discharged from the tank 9 through the sludge drain 12 and a sludge hopper 14 to a dehydrator 15 for a dehydrating treatment. The sludge is thereafter passed to a subsequent process.

A bottom drain 16 is connected to the hopper-like bottom structure of the second separator tank 9 for withdrawing the stored water W in a predetermined quantity relative to the water supply through the feed hopper 11 (which is about 70% of the water supply). The withdrawal of water through the bottom drain 16 results in uniform downflows while middle and lower part of the water is stably stored in the reservoir region. The paint sludge S sedimenting in the reservoir region is smoothly discharged, along with the water W, from the tank 9.

Numeral 17 denotes a flow control valve mounted on the bottom drain 16 for controlling the quantity of water to be discharged. This flow control valve 17 includes a converging passage to have a valve passage area gradually decreasing in a downstream direction, thereby to control flow rate. This construction is effective to pass the discharged paint sludge S without arresting and collecting the sludge therein.

Numeral 18 denotes a bottom opening for allowing maintenance work, which is normally closed by a blank cover.

The one side wall of the second separator tank 9 where the feed hopper 11 is formed has a double wall structure defining an ascending drain passage 19. The stored water is discharged through this drain passage 19 in a quantity corresponding to a difference between the water supply through the feed hopper 11 and drainage through the bottom drain 16. An overflow tank 22 is disposed next to the ascending drain passage 19, which receives water W from the drain passage 19, overflowing a level control barrier 20 in an upper drain 21. Thus, the level control barrier 20 has a level setting function based on the overflow of water to be discharged. Consequently, the water is stored in the second separator tank 9 constantly at a predetermined level suited for separation and disposal of the floating paint sludge S through the sludge drain 12.

The ascending drain passage 19 for overflow discharge is formed by the double wall structure, with a wide inlet opening 19a at a lower end thereof extending through an entire width of the one side wall. The inlet opening 19a is disposed adjacent a bottom of the reservoir region. Consequently, the uniform descending flows, which maintain the lower part of the stored water in a stable condition, are little disturbed by streams of water entering the inlet opening 19a.

As noted above, the inlet opening 19a at the lower end of the ascending drain passage 19 is disposed adjacent the bottom of the reservoir region and formed in the one side wall opposite the floating sludge drain 12. It will be appreciated that part of the floating paint sludge S moves into lower part of the stored water as the upper horizontal flows V are deflected downwardly adjacent the sludge drain 12. Because of the above-noted position of the inlet opening 19a, the downwardly deflected part of sludge S will hardly flow into the ascending drain passage 19 before rising to the surface again.

The water W discharged through the bottom drain 16 and the water W discharged through the upper drain 21 return confluently to the first separator tank 6 by way of a passage 23.

The feed hopper 11 of the second separator tank 9 has a uniform width D1 as seen in the direction pointing to the floating sludge drain 12, and a width D2 perpendicular to the direction pointing to the sludge drain 12 which increases progressively toward an upper delivery opening 11a of the feed hopper 11. A pipe 8a defining the passage 8 for supplying the water from the sludge pit 6a of the first separator tank 6 to the second separator tank 9 is connected in a horizontal posture through the one side wall to a lower end of the feed hopper 11.

Thus, the water W supplied horizontally through the pipe 8a into the lower end of the feed hopper 11 collides with an inner wall of the hopper 11 to lose some of its force. Further, the water W thus supplied is decelerated in its ascent toward the upper delivery opening 11a owing to the increasing sectional area of the passage through the feed hopper 11. This results in a reduced dynamic pressure under which the water W is delivered to the upper positions in the reservoir region. The deceleration of the water supply also checks disturbance of the upper part of the stored water due to the dynamic delivery pressure. In this way, the paint sludge S is allowed to rise to the water surface and remain afloat thereon stably, and the floating paint sludge S is effectively collected by the upper horizontal flows toward the sludge drain 12.

In addition, growth and rise of the floatable paint sludge are promoted in the course of decelerated upward flow of the water through the feed hopper 11.

A damper 24 is provided above the upper delivery opening 11a of the feed hopper 11, with which the water W delivered upward from the upper delivery opening 11a collides in the stored water. The damper 24 produces the effect of preventing the incoming water from causing upheaval of the water surface in the reservoir region. The water W delivered for treatment is damped through this collision and smoothly forwarded to horizontal flow regions on the upper part of the stored water.

The damper 24 also acts as a lid for preventing sludge S floating on the surface of stored water above the upper delivery opening 11a from flowing into the feed hopper 11 when the stored water W is drained from the second separator tank 9.

The damper 24 includes a V-shaped lower impingement surface 24a opposed to the upwardly delivered water W, with a middle position in the direction perpendicular to the direction pointing to the sludge drain 12 (i.e. transversely of the horizontal flows V) projecting downwardly toward the upper delivery opening 11a.

This construction guides the water W flowing from the upper delivery opening 11a to spread transversely of the upper horizontal flows V. The water W delivered is forwarded to the upper horizontal flow regions with enhanced smoothness. Fine bubbles present in the water W delivered for treatment are prevented from collecting under the lower surface of the damper 24. This precludes the possibility of the bubbles growing to certain sizes under the lower surface and then rising to the surface of the stored water to disturb the water surface.

Further, the damper 24 has an upper surface 24b inclined downwardly toward the floating sludge drain 12. As noted above, the damper 24 acts also as a lid to prevent the paint sludge S from entering the feed hopper 11 when the stored water W is drained from the second separator tank 9. The inclined upper surface 24b guides the sludge S floating adjacent thereto toward the center of the second separator tank 9 as the water level becomes lower. Consequently, no paint sludge S likely to enter the feed hopper 11 will remain on the upper surface 24b of the damper 24.

The feed hopper 11 includes an orifice plate 25 provided in a vertically intermediate position thereof for constricting the inner passage thereof in the direction pointing to the floating sludge drain 12. The inner passage constricted by the orifice plate 25 produces the effect of uniforming, in the direction perpendicular to the direction pointing to the sludge drain 12, the rising speed of the water W through the feed hopper 11. The upper horizontal flows V are formed with enhanced stability by the speed of the water emerging from the upper delivery opening 11a which is uniformed transversely of the upper horizontal flows V.

Paint sludge may be deposited in the corner at the lower end of the feed hopper 11 where the water transmitted through the passage 8 is deflected upward. To remove such paint sludge, the feed hopper 11 defines a maintenance opening 26 having a lid, for communicating with the corner at the lower end thereof.

In FIG. 1, numeral 27 denotes a coagulant feeder for adding a coagulant to the water W supplied to the second separator tank 9, numeral 28 denotes a feeder for adding a pH regulator and a primary treating agent to the water W transmitted from the spraying booth 1 to the first separator tank 6, and numeral 29 denotes a feeder for adding a killer to the mist capturing water W recirculated from the first separator tank 6 to the downflow pan 3 in the spraying booth 1.

Other embodiments will be set out hereunder.

The foregoing embodiment includes the skimmer 13 for separating the floating paint sludge S and discharging it to the sludge drain 12. This embodiment may be modified to push the floating paint sludge S into the sludge drain 12 by means of the upper horizontal flows V, or to cause the floating paint sludge S to overflow into the sludge drain 12 along with part of the stored water W.

Figure 5:
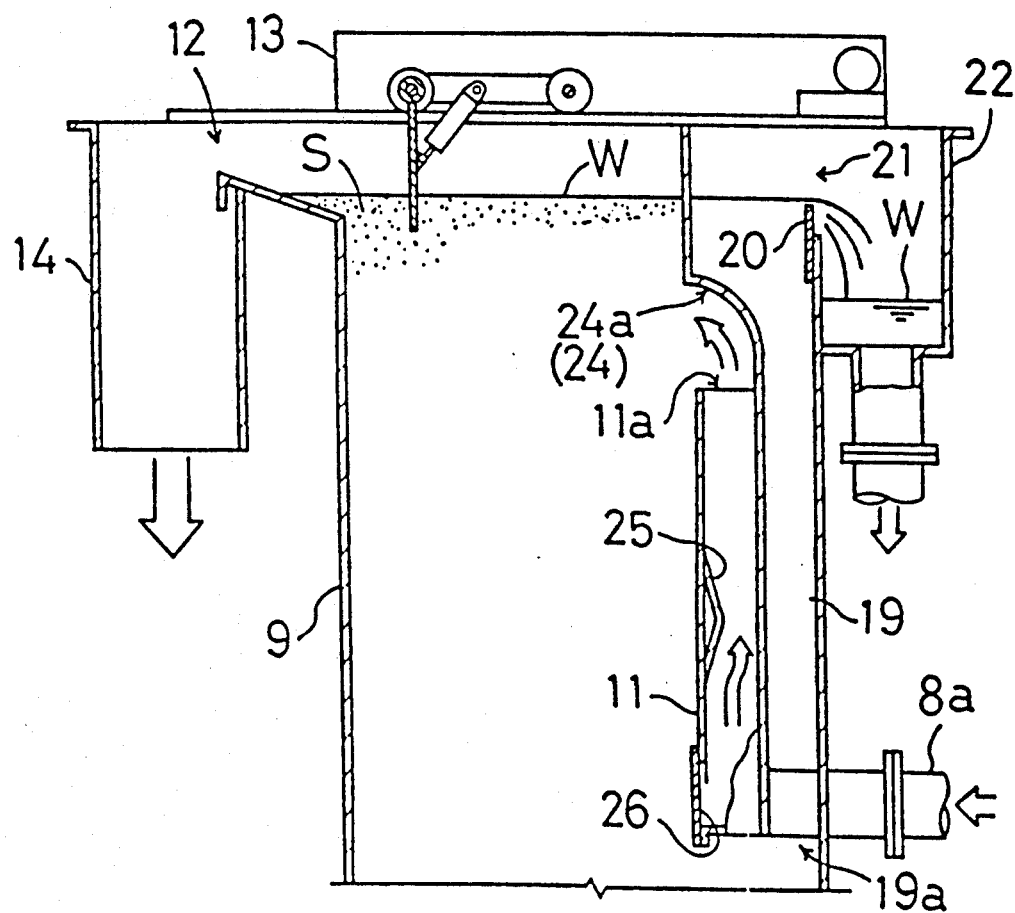
FIG. 5 is an enlarged sectional view of a different embodiment.
Figure 6:
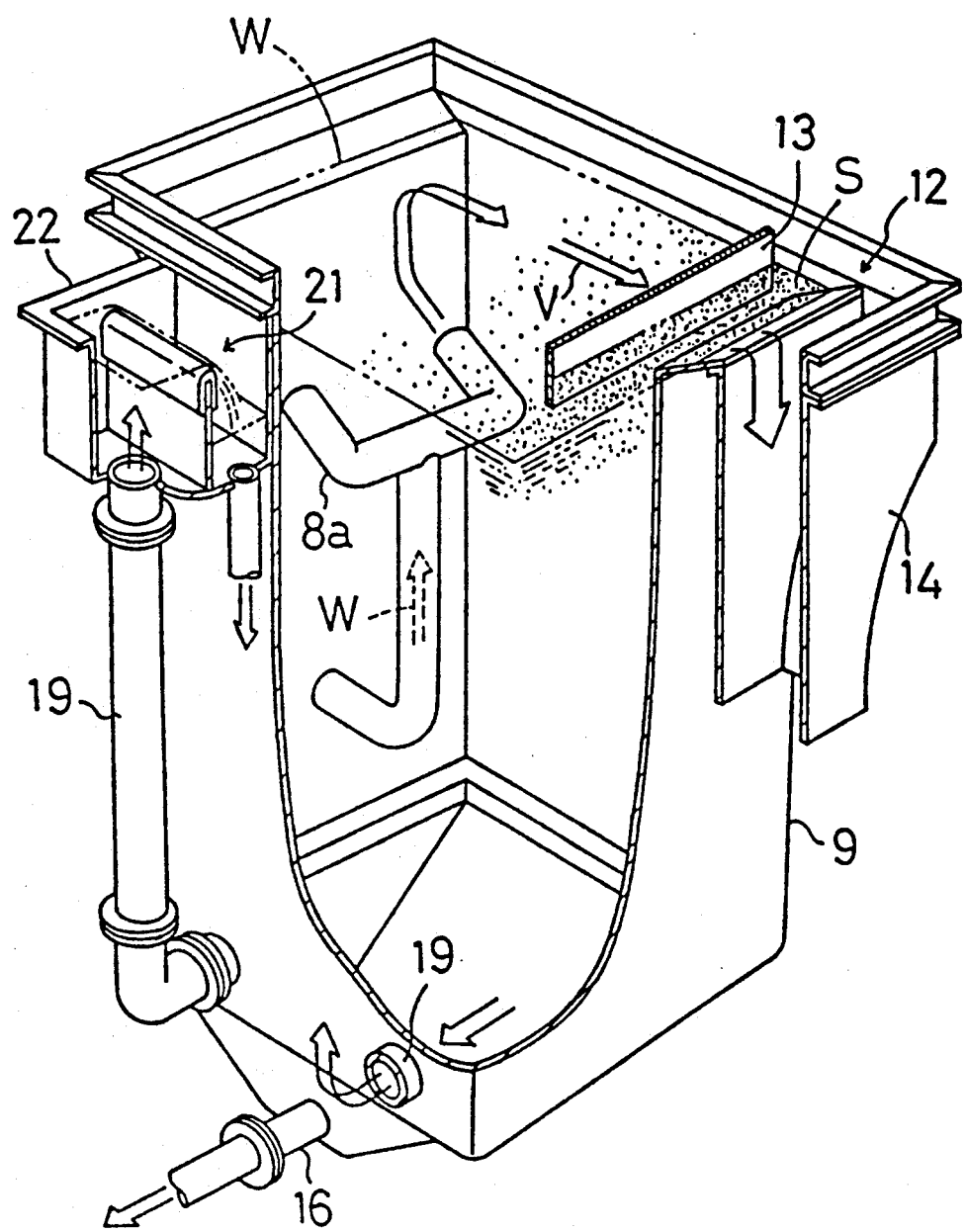
FIG. 6 is a perspective view, partly broken away, of a conventional separator tank.

As shown in FIG. 5, the damper 24 may define a curved impingement surface 24a for guiding the water W delivered upward from the feed hopper 11 and colliding with the impingement surface 24a in the stored water. The specific shape and construction of the damper 24 are variable in many ways.

The orifice plate defining the constriction 25 of the inner passage of the feed hopper 11 in the direction pointing to the floating sludge drain 12 may be replaced by a structure for gradually narrowing the inner passage as shown in FIG. 5. The constriction 25 may be formed to gradually enlarge the inner passage downstream thereof to prevent sludge deposition on and adjacent the constriction 25. The specific shape and construction of the constriction 25 are variable in many ways.

The paint-containing liquid to be treated is not limited to water. Such liquid may or may not be pretreated in the first separator tank 6 as in the foregoing embodiment. The present invention may be adapted for treating other types of liquid than the spray mist capturing liquid.

In the foregoing embodiment, the sludge barrier 12a of the floating sludge drain 12 has a vertical wall structure on a sludge discharge side thereof. Instead, the sludge barrier 12a may include a curved sludge discharge surface bulging upward and gradually lowering toward a forward end thereof.

What is claimed is:

1. A paint sludge separator tank comprising:
   a sludge drain formed on an upper end of a reservoir region for discharging paint sludge floating on a surface of stored liquid; and
   a liquid feeder for feeding paint-containing liquid to an upper position of said reservoir region horizontally spaced from said sludge drain;
   wherein said liquid feed includes a feed hopper defining a sectional passage area progressively enlarging toward an upper delivery opening thereof communicating with the upper position of said reservoir region, said feed hopper having a width in a direction pointing to said sludge drain which is uniform and a width perpendicular to said direction pointing to said sludge drain which increases progressively toward said upper delivery opening, said feed hopper having a liquid supply passage connected to a lower position thereof.

2. A paint sludge separator tank as claimed in claim 1, further comprising an impingement surface forming member with which the liquid delivered upward from said upper delivery opening for treatment collides in said stored liquid.

3. A paint sludge separator tank as claimed in claim 2, wherein said feed hopper includes a constriction formed between said lower position thereof to which said liquid supply passage is connected and said upper delivery opening for narrowing an inner passage thereof in the direction pointing to said sludge drain.

4. A paint sludge separator tank as claimed in claim 3, wherein said impingement surface forming member includes a V-shaped lower impingement surface having a middle position in said direction perpendicular to the direction pointing to said sludge drain projecting downwardly toward said upper delivery opening of said feed hopper, and an upper surface inclined downwardly toward said sludge drain.

5. A paint sludge separator tank as claimed in claim 4, wherein said feed hopper includes a maintenance opening having a lid, for communicating a corner in said lower position thereof.

6. A paint sludge separator tank as claimed in claim 3, wherein said impingement surface forming member includes a curved impingement and guiding surface, and said constriction is shaped to gradually enlarge said inner passage of said feed hopper downstream thereof.

7. A paint sludge separator tank as claimed in claim 1, wherein said feed hopper includes a constriction formed between said lower position thereof to which said liquid supply passage is connected and said upper delivery opening for narrowing an inner passage thereof in the direction pointing to said sludge drain.

8. A paint sludge separator tank comprising:
   a sludge drain formed on an upper end of a reservoir region for discharging paint sludge floating on a surface of stored liquid; and
   a liquid feeder for feeding paint-containing liquid to an upper position of said reservoir region horizontally spaced from said sludge drain;
   wherein said liquid feeder includes a feed hopper defining a sectional passage area progressively enlarging toward an upper delivery opening thereof communicating with the upper position of said reservoir region, said feed hopper having a liquid supply passage connected to a lower position thereof, wherein said feed hopper has a width perpendicular to a direction pointing to said sludge drain which increases progressively toward said upper delivery opening, said feed hopper including a constriction formed between said lower position thereof to which said liquid supply passage is connected and said upper delivery opening for narrowing an inner passage thereof in the direction pointing to said sludge drain, wherein said constriction is in the form of an orifice plate.

* * * * *